United States Patent
Simons et al.

(10) Patent No.: US 10,581,805 B2
(45) Date of Patent: Mar. 3, 2020

(54) BLOCKCHAIN OVERWATCH

(71) Applicant: GCP IP Holdings I, LLC, Denver, CO (US)

(72) Inventors: Jordan Simons, Denver, CO (US); Steve Ernst, Walnut Creek, CA (US)

(73) Assignee: GCP IP Holdings I, LLC, Denver, CO (US)

( * ) Notice: Subject to any disclaimer, the term of this patent is extended or adjusted under 35 U.S.C. 154(b) by 0 days.

(21) Appl. No.: 16/436,820

(22) Filed: Jun. 10, 2019

(65) Prior Publication Data
US 2019/0379642 A1    Dec. 12, 2019

Related U.S. Application Data

(60) Provisional application No. 62/682,533, filed on Jun. 8, 2018.

(51) Int. Cl.
*G06F 9/00* (2006.01)
*H04L 29/06* (2006.01)
(Continued)

(52) U.S. Cl.
CPC ...... *H04L 63/0414* (2013.01); *G06F 16/2379* (2019.01); *G06N 20/00* (2019.01);
(Continued)

(58) Field of Classification Search
CPC ............. H04L 63/0414; H04L 63/0281; H04L 63/1425; H04L 9/0637; H04L 2209/38; H04L 2209/56; G06F 16/2379; G06N 20/00; G06Q 20/389; G06Q 20/3829; G06Q 20/0658; G06Q 2220/00
(Continued)

(56) References Cited

U.S. PATENT DOCUMENTS

2015/0310424 A1    10/2015    Myers
2016/0321654 A1    11/2016    Lesavich et al.
(Continued)

OTHER PUBLICATIONS

International Application No. PCT/US2019/036419, International Search Report & Written Opinion, 8 pages, dated Aug. 30, 2019.

*Primary Examiner* — Mohammad W Reza

(57) ABSTRACT

Various embodiments of the present technology provide a distributed overwatch system that allows transactions with government-grade privacy and security. The security and privacy can be achieved by a combination of distributed trusted proxies, to which anonymous users connect with the overwatch of a variety of network security engines. The structured ecosystem provides mechanism for the blockchain to be monitored by an overwatch capability combining big data analytics, intelligent learning, and comprehensive vulnerability assessment to ensure any risks introduced by vulnerabilities are effectively mitigated. The system may include multiple proxy servers geographically distributed around the world. Each proxy can be associated with local network security engines to probe and analyze network traffic. Each proxy can mask sensitive data (e.g., personally identifiable information) within the transaction before it is stored. Various embodiments can interface with most blockchain or distributed ledger technologies that support multi-signature transactions and/or smart contracts.

17 Claims, 11 Drawing Sheets

(51) Int. Cl.
  *G06F 16/23*    (2019.01)
  *H04L 9/06*     (2006.01)
  *G06Q 20/06*    (2012.01)
  *G06Q 20/38*    (2012.01)
  *G06N 20/00*    (2019.01)

(52) U.S. Cl.
  CPC ....... *G06Q 20/0658* (2013.01); *G06Q 20/389* (2013.01); *G06Q 20/3829* (2013.01); *H04L 9/0637* (2013.01); *H04L 63/0281* (2013.01); *H04L 63/1425* (2013.01); *G06Q 2220/00* (2013.01); *H04L 2209/38* (2013.01); *H04L 2209/56* (2013.01)

(58) Field of Classification Search
  USPC .......................................................... 726/12
  See application file for complete search history.

(56) References Cited

U.S. PATENT DOCUMENTS

| | | |
|---|---|---|
| 2017/0132620 A1 | 5/2017 | Miller et al. |
| 2017/0178237 A1 | 6/2017 | Wong |
| 2017/0302663 A1 | 10/2017 | Nainar et al. |
| 2019/0156336 A1* | 5/2019 | Kasthuri ............... G06Q 20/065 |
| 2019/0180266 A1* | 6/2019 | Sidhu ................... G06Q 20/223 |

\* cited by examiner

BLOCKCHAIN OVERWATCH

CROSS-REFERENCE TO RELATED APPLICATIONS

This application claims priority to U.S. Provisional Application Ser. No. 62/682,533 filed Jun. 8, 2018, which is incorporated herein by reference in its entirety for all purposes.

TECHNICAL FIELD

Various embodiments of the present technology generally relate to blockchain privacy and security. More specifically, the embodiments of the present technology relate to a blockchain overwatch system that provides secure communications, ensures privacy, and actively monitors transactions to identify various security threats.

BACKGROUND

Blockchains allow a network of users to make a distributed ledger of data and share the data among the other users or nodes in the network. Unlike traditional database structures, the blockchain ledger is maintained by a multitude of independent nodes spread across a large distributed network. When a transaction is recorded into a block within the blockchain, it is very difficult, if not impossible, to change or remove that data since the data is stored in more than one node in the distributed network. Each of these blocks typically includes a cryptographic hash of the previous block, a timestamp, and the transaction data. Moreover, any data added into the blockchain requires a consensus (e.g., a majority) of nodes to agree to the addition. This distribution of control to modify from the blockchain creates a trusted immutable ledger recording transactions or data.

Public blockchains have no restrictions and anyone with a connection to the network may be able to review entries within the blockchain or request new transactions or data be added. Other types of blockchains include private and hybrid (e.g., a combination of public and private) configurations. However, each node typically has access to the transactions recorded making privacy and anonymity difficult to ensure. In addition, the security of the data becomes important as additional information is stored within each block. As such, there are a number of challenges and inefficiencies created in traditional blockchain systems.

SUMMARY

Various embodiments of the present technology generally relate to blockchain privacy and security. More specifically, the embodiments of the present technology relate to a blockchain overwatch system that provides secure communications, ensures privacy, and actively monitors transactions to identify various security threats. In some embodiments, a method can include receiving, at a proxy, a transaction from a first endpoint within multiple endpoints associated with the proxy. The transaction can include transaction data with a request to add the transaction to a distributed ledger system. The transaction data may also include personally identifiable information. The method can mask the personally identifiable information using a private key. A block producer can be randomly selected to verify the transaction. The transaction can be routed to the randomly selected block producer for validation.

Embodiments of the present technology also include computer-readable storage media containing sets of instructions to cause one or more processors to perform the methods, variations of the methods, and other operations described herein.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
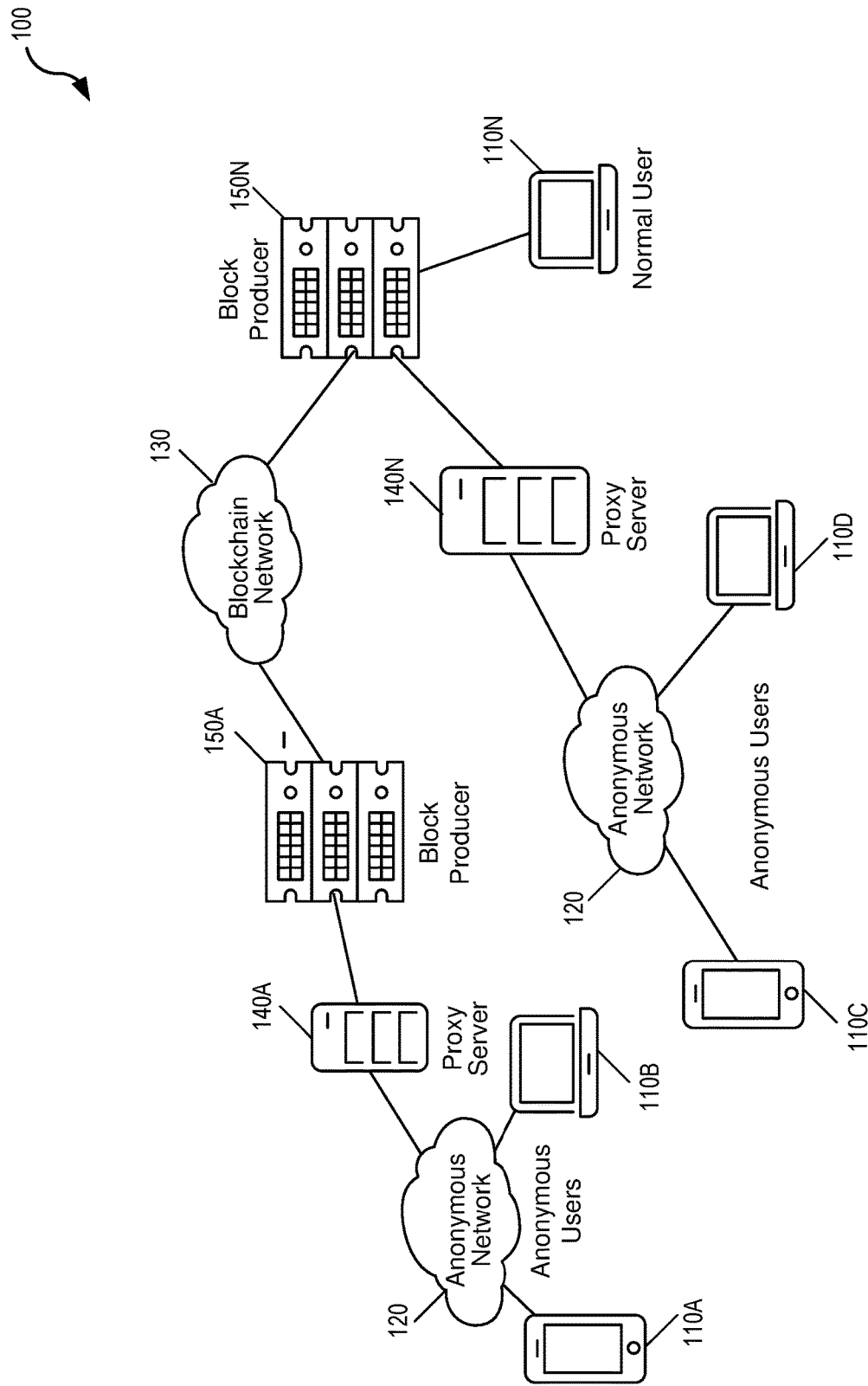
FIG. 1 illustrates an example of an environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to blockchain privacy and security. More specifically, the embodiments of the present technology relate to a blockchain overwatch system that provides secure communications, ensures privacy, and actively monitors transactions to identify various security threats. The current blockchain ecosystems (e.g., blockchain 1.0 and 2.0) lack real privacy and overall security. Moreover, many of the original cryptocurrency systems using blockchains were centralized in a manner that presented a variety of security and scalability issues. The next generation of blockchain ecosystems used a distributed architecture that created the use of delegates (e.g., block providers) to act on these actions and help geographically distribute them, allowing the transactions to move closer to the endpoint of the user. This structure has opened up security issues. In addition, current blockchain technology provides for complete transparency of every transaction, as the ledger has every bit of transaction information stored thereon.

In contrast, various embodiments of the present technology provide for a distributed overwatch system that allows transactions with government-grade privacy and security. This level of security and privacy can be achieved by a combination of distributed trusted proxies, to which anonymous users connect with the overwatch of a variety of network security engines. The structured ecosystem provides mechanism for the blockchain to be monitored by an overwatch capability combining big data analytics, intelligent learning, and comprehensive vulnerability assessment to ensure any risks introduced by vulnerabilities are effectively mitigated. The system may include multiple proxy servers geographically distributed around the world. Each proxy can be associated with local network security engines to probe and analyze network traffic. Each proxy can mask sensitive data (e.g., personally identifiable information) within the transaction before it is stored. Various embodiments can interface with most blockchain or distributed ledger technologies (e.g., Bitcoin, Ethereum, etc.) that support multi-signature transactions and/or smart contracts.

Various embodiments of the present technology provide for a wide range of technical effects, advantages, and/or improvements to computing systems and components within blockchain or distributed ledger systems. For example, various embodiments include one or more of the following technical effects, advantages, and/or improvements: 1) intelligent tapping of network traffic and its meta-data; 2) integration of machine learning to analyze tapped network traffic to identify threat vectors and/or traffic outliers; 3) automatic updating of threat analysis rules using unsupervised learning; 4) use of proxy servers to mask the personally identifying information (e.g., by encryption and masking); 5) randomization of communications between system components (e.g., proxy servers and block producers) to create a more secure communication structure (e.g., by deterring man-in-the-middle attack); 6) use of unconventional and non-routine computer operations to establish a secure communication channel between parties of a (potential) transaction which can be automatically analyzed (e.g., using machine learning) to ensure compliance with governmental regulations, terms of use, or other restrictions; 7) use of unconventional and non-routine computer operations to provide a distributed learning system that can efficiently analyze tapped data without requiring all the data be sent to a centralized location; 8) changing the manner in which transactions and communications are processed between client devices and blockchain ledgers; 9) integration of a robust security and privacy paradigm into any existing blockchain system; 10) aggressive threat detection within the blockchain infrastructure; 11) analysis of traffic at linespeed; 12) continuous learning via post-data analysis; 13) seamless integration with the communications technology to become network aware; 14) use of non-human game theory and capability that creates an autonomous consensus model inside the machine learning agents and system itself; 15) inclusion of blockchain transactional data; and/or 16) colorations between tapped network meta-data and the blockchain transactional data.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

FIG. 1 illustrates an example of an environment 100 in which some embodiments of the present technology may be utilized. As illustrated in FIG. 1, environment 100 may include one or more electronic devices 110A-110N (such as a mobile phone, tablet computer, laptop, computer, mobile media device, vehicle-based computer, wearable computing device, etc.), anonymous network 120, blockchain network 130, proxy servers 140A-140N, and block producers 150A-150N. As illustrated in FIG. 1, a distributed overwatch system can be used to support blockchain transactions with government-grade privacy and security. This level of security and privacy can be achieved by a combination of distributed trusted proxies 140A-140N, to which anonymous users or endpoints 110A-110N connect. As shown in more detail in FIG. 2, the structured ecosystem provides mechanism for the blockchain to be monitored by an overwatch capability combining big data analytics, intelligent learning, and comprehensive vulnerability assessment to ensure any risks introduced by vulnerabilities are effectively mitigated.

In addition, electronic devices 110A-110N can include network communication components that enable the mobile devices to communicate with proxy servers 140A-140N by transmitting and receiving wireless signals using licensed, semi-licensed, or unlicensed spectrum over communications network 120. In some cases, anonymous networks 120 and/or blockchain networks 130 may be comprised of multiple networks, even multiple heterogeneous networks, such as one or more border networks, voice networks, broadband networks, service provider networks, Internet Service Provider (ISP) networks, and/or Public Switched Telephone Networks (PSTNs) interconnected via gateways operable to facilitate communications between and among the various networks. Anonymous networks 120 and/or blockchain networks 130 can also include third-party communications networks such as a Global System for Mobile (GSM) mobile communications network, a code/time division multiple access (CDMA/TDMA) mobile communications network, a $3^{rd}$ $4^{th}$ or 5th generation (3G/4G/5G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), or other communications network.

The multiple proxy servers 140A-140N may be geographically distributed around the world. Each proxy server 140A-140N can be associated with local network security engines (not shown in FIG. 1) to probe and analyze network traffic. These security engines may be integrated into proxy servers 140A-140N or be physically separated from proxy servers 140A-140N. Each proxy server 140A-140N can mask sensitive data (e.g., personally identifiable information) within the transaction before the transaction is recorded on the blockchain.

Each node proxy server 140A-140N can serve the role of a gateway, masking any number of anonymous clients while appearing as a normal user on the blockchain network. The proxy's users can be hidden in an anonymous network and receive copies of blockchain traffic destined to the user's associated ledger identity. In accordance with various embodiments, this can be done via an internal anonymous messaging system. The internal messaging system can allow a user to securely and anonymously interact with the blockchain, as well as other users within their own proxy group, or within other proxy groups. The messaging system can be based on proven high-security messaging technology providing Off-The-Record (OTR) privacy and anonymity. Off-the-Record Messaging (OTR) is an example of a cryptographic protocol that provides encryption for instant messaging conversations that may be used in some embodiments.

In addition to authentication and encryption, OTR can provide deniable authentication for the conversation participants while keeping conversations confidential, like a private conversation in real life or "off the record" in journalism sourcing. The distribution of normal messages (e.g., not payments) can be facilitated by the blockchain or distributed by the proxies ("off-chain"). Off-chain messages must still be copied to all of the proxy's local clients to maintain anonymity. Since the messages do not reveal source and destination information, and since these are only accessed off-the-wire, it is not possible to determine who received what from whom.

Messages sent from a proxy client to the proxy itself (e.g., payment instructions) may also be distributed to the rest of the proxy members. This broadcast distribution makes it infeasible to determine whether they are proxy instructions or just messages to other clients in the proxy's anonymous network. Each message can include a sub-message marker, which can only be decrypted by the intended recipient, used to determine the intended recipient. The marker may also contain the necessary public keys required to decrypt the main message. As such, in some embodiments, the anonymous users test each message copied to them by the proxy to determine whether the message is destined for them. A single Elliptic Curve Diffie-Hellman (ECDH) computation may be sufficient to make such a determination. Thereafter, the source user public key can be extracted, and the rest of the message decrypted.

Unlike other anonymous blockchains, users within an anonymous group do not have to process the messages and transactions of all other proxy groups (i.e., the system is scalable). Scalability is achieved through the use of multiple proxies (e.g., no limit). Each proxy and associated user only have to deal with messages related to their group. Other anonymous blockchain architectures rely on users keeping track of all transactions and some require heavier computations. Some embodiments may use multiple proxies with varying numbers of users. Proxies with large user groups will be more suitable for low traffic applications and general payments, while other smaller groups will be more suitable for higher traffic applications.

As illustrated in FIG. 1, the illustrated ecosystem can also support regular users (e.g., normal user using electronic device 110N) who are more worried about content security and performance, rather than complete anonymity. These users can operate just like normal EOSIO users but will have the benefit of strong cryptography and a more secure infrastructure.

In some embodiments, users may initially communicate their public keys to each other via any out-of-band channel. Later on, this may include a blockchain database where public keys can be looked-up using an index. The index would have to be communicated out-of-band, but users that know each other will already have an out-of-band communications system. Commercial web servers that subscribe to an anonymous payment system may advertise their public key on their website (which can change from time-to-time). Only the sender needs to know the destination public key, as the recipient will learn the sender's public key from the decrypted message. Hereafter, parties can securely exchange new public keys as often as they like using the anonymous messaging system. Since various embodiments do not impose a centralized Public Key Infrastructure (PKI), users may be required to confirm their public keys by out-of-band means, or by including something in the message that is recognizable by the recipient as past shared knowledge.

In any electronic communication system, you need to provide some form of personal identifier out-of-band. The advantage of the personal identifier being a public key is that users are getting the information more directly, rather than using a Unique Identifier (UID) to look it up. The issue of establishing initial trust is an intractable problem in all secure communication systems. Some embodiments may rely on more complicated techniques for securing the process. A useful method of confirming information out-of-band is to convey the information on a secure voice call.

Figure 2:
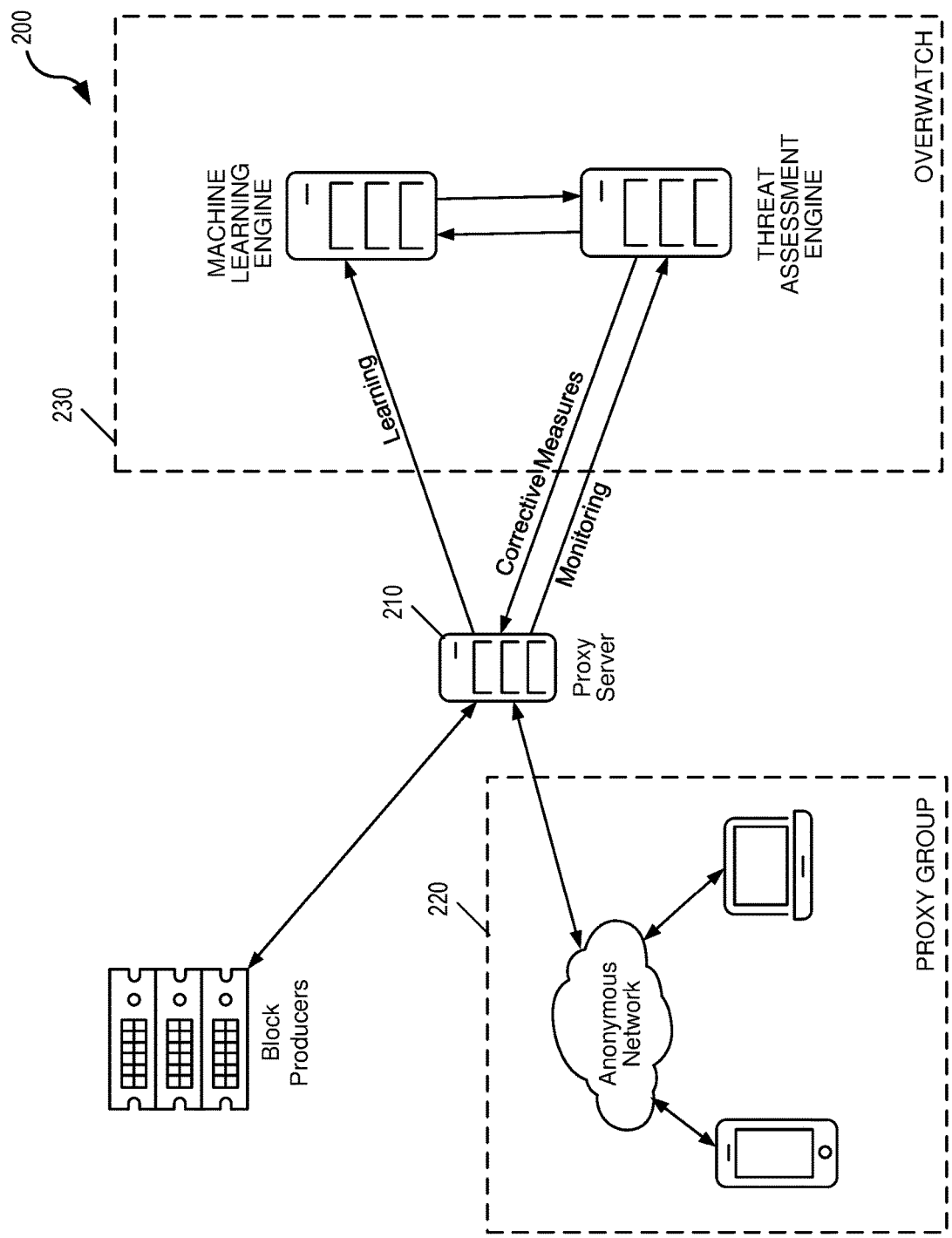
FIG. 2 illustrates an example of proxy server assigned to a proxy group and a local overwatch agent for threat assessment.

FIG. 2 illustrates an example of proxy server 210 assigned to a proxy group 220 and a local overwatch agent 230 for threat assessment. The overwatch system 230 may be configured to assess both the blockchain transaction and the end-user point-of-interaction with the blockchain. This may be beneficial because the vast majority of cyber-attacks on blockchain systems are aimed at "Blockchain Touch Points." This is to say the point at which an object outside of the blockchain core interacts with the blockchain and vice versa.

The overwatch monitoring system can provide relevant IT security standards and regulatory standards are 'engineered in' to enable the overall network to measure its global security posture in near real-time through active assessments as opposed to passive log collection and correlation. This is a first for distributed ledger technology—the ability to remediate vulnerabilities and weaknesses within hours of them being detected. As a result, the blockchain system is secured in a way that is extremely unlikely to be compromised, even by a malicious state actor.

Some embodiments can assess the network without intermission. Any weaknesses that are detected will be escalated and funneled into a priority remediation queue. Once the weakness is remediated, the component in question will undergo validation. Upon receiving confirmation from the validation module, the overwatch agent can adjust the risk posture/score of the network accordingly. The process, from assessment to remediation, will generally not take more than 24 hours for critical security concerns. This level of solution-ingrained security and continued assessments, linked to remedial teams, coupled with a 30-60% advantage as it relates to threat identification, will make blockchains secured by the overwatch ecosystem the most security conscious blockchain.

In accordance with some embodiments, the overwatch agent can run out of band relative to the blockchain. This can be accomplished by creating a tap (e.g., an inline tap, a passive tap, etc.) on proxy 210 to gain access to the network traffic. As a result, downtime of the overwatch agent 230 has no effect on the normal operation of the blockchain and the physical deployment is distributed between a number of geographic locations based on capacity requirements and provides fail-over between nodes if one instance goes offline.

In addition, this information together with the total result set from the assessment will be fed into a predictive analysis engine across multiple elements (e.g., 1000+ elements) to baseline, detect, and predict advanced threats. Further, some embodiments of the overwatch agent 230 may provide continuous feedback and recommendations on newly detected network anomalies and threat vectors. Some embodiments may deploy machine learning agents like the aforementioned distributed meta-miners to constantly assess, mitigate, respond, neutralize, and optimize the ecosystem. Machine learning technology may be built into the overwatch agent 230 and assist in refining the quality of governance. One objective is to enable secure and private transactions while continually detecting and blocking the activities of bad actors on the ecosystem.

The combination of advanced threat detection with machine learning has key advantages: 1) aggressive threat detection within the blockchain infrastructure; 2) analysis of traffic at line-speed; 3) continuous learning via post-data analysis; 4) seamless integration with the communications technology to become network aware; and/or 5) non-human game theory and capability that creates an autonomous consensus model inside the machine learning agents and system itself.

Probes or minors can be used in various embodiments to tap the network traffic. The probes or minors can sit at strategic locations in infrastructure. For example, 10 Gb/sec tapping rates may be realized using different technologies (e.g., Napa Tech Cards). A software package may be used as a deep package inspector. The overwatch agent can analyze the traffic (e.g., packages and payloads of the data). Some embodiments use a rule engine that can set locations and rules across minors. For example, a rule may be set such that any suspicious activity moving from engineering endpoint to an accounting endpoint creates an action (e.g., analyzed deeper, generates a flag, etc.).

Some embodiments may use concentrators to generate an aggregated report, or send alerts, and/or other activity from the miners. In some embodiments, the analysis can be performed locally on the miners and that analysis can then be aggregated remotely. Those that were aggregators are sent to the concentrators, which then process the necessary analytics, like alerts and rules, and push rules back to the miners. To apply the rules to the data of the miners, certain patterns or data transactions can be identified and machine learning can be applied to that flow.

The overwatch agent 230 may identify baselines of the network and then monitor for outliers or anomalies which, in view of the rules, can be used to understand and identify threat vectors. As such, the overwatch agent 230 will become smarter and more effective at identifying threats as time goes on. Some embodiments may use supervised learning.

In some embodiments, the overwatch agent 230 may also receive metadata from the block producers. For example, the metadata could include various data from layer 3, 4 and layer 7 such as IP address, MAC address, application data, etc. This additional data could be used by the overwatch agent to improve graphs of transactions, geolocation, and time series analysis.

Figure 3:
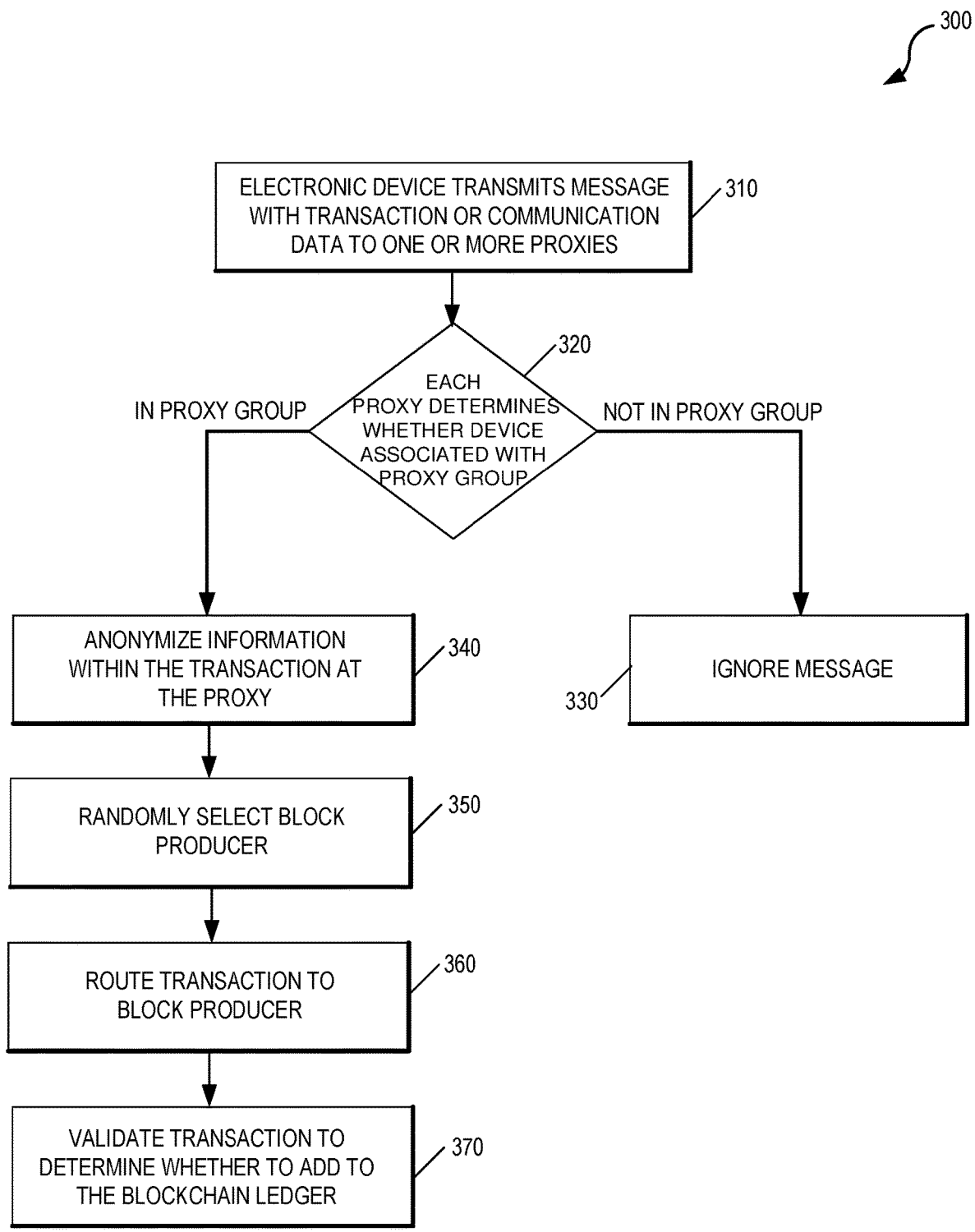
FIG. 3 is a flowchart illustrating an example of a set of operations for operating a proxy server in accordance with some embodiments of the present technology.

FIG. 3 is a flowchart illustrating a set of operations 300 for processing a transaction in accordance with some embodiments of the present technology. The operations illustrated in FIG. 3 can be performed by electronic devices 110A-110N, proxy servers 140A-140N, block producers, and/or one or more components (e.g., processor(s)), engines, and/or modules. As illustrated in FIG. 3, electronic devices can transmit messages with transaction or communication data to one or more proxies during transmission operation 310. In some embodiments, the devices may randomly select a fixed number (e.g., ten) of proxies. In other embodiments, the devices may send the messages to a fixed set of proxies (which could be changed intermittently, periodically, or on some schedule).

As the messages are received at each proxy, each proxy will determine whether the message was intended for that proxy during determination operation 320. This could be done, for example, by associating groups of devices with each proxy. When a proxy determines that the device was not in the proxy group, then determination operation 320 can branch to disregard operation 330 where the message is ignored or discarded. When a proxy determines that the device was in the proxy group, then determination operation 320 can branch to anonymize operation 340 where information within the transaction can be anonymized.

Anonymization operation 340 can mask or hide some parts of information within the transaction data or communication. For example, the proxy server may mask some parts of that component. As a result, the blockchain or distributed ledger will not get a name or social security number, for example, but there will be a place where that information is held and secured. Some embodiments may encrypt portions of the data on the ledger that parties do not want people to be able to be accessed easily, and a key can be stored in the proxy as a key vault. There may also be public keys to start the authentication and private keys that will never see the light of day and need to be protected because those keys unlock the encrypted data on the blockchain.

Selection operation 350 can randomly select a block producer to send the transaction to for validation. Once the block producer is identified, routing operation 360 can route the masked transaction to the block producer for validation using validation operation 370 to determine whether the transaction can be added to the blockchain or ledger. In some embodiments, validation operation 370 may use a consensus model to validate the transaction (e.g., checking whether the end points are valid, the information coming in is valid, required number of parties, required number of contracts, etc.).

By transmitting the message from the device to multiple proxies and randomly selecting which block producer a transaction gets routed to, interception of traffic becomes more difficult because there is no pattern from one transaction to the next. Moreover, from the perspective of a third party looking in, the third party should not be able to figure out traffic between the proxy, client, and block because the communications are random.

Figure 4:
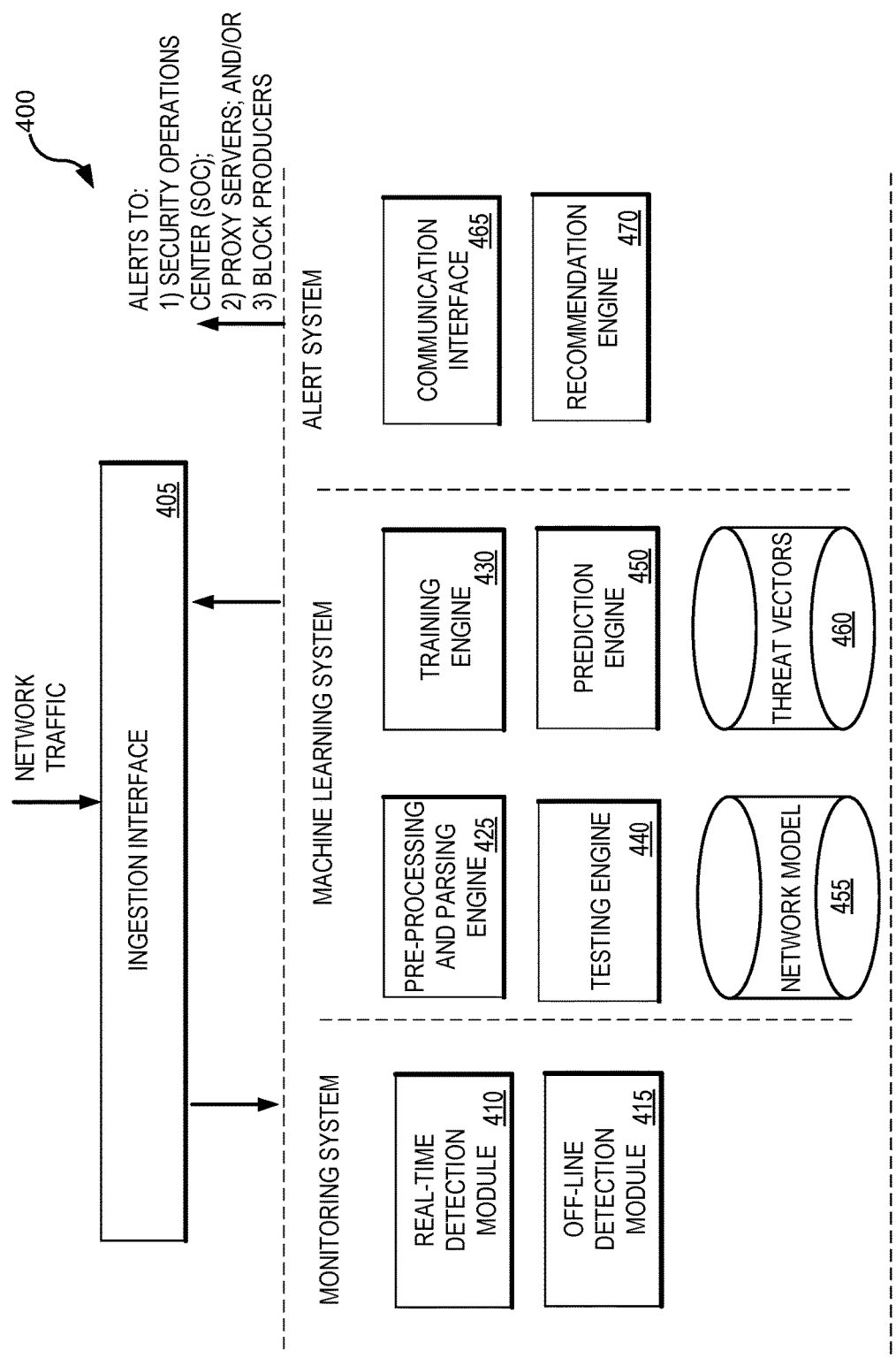
FIG. 4 illustrates an example of a set of components within an overwatch agent according to one or more embodiments of the present technology.

FIG. 4 illustrates a set of components within an overwatch agent according to one or more embodiments of the present technology. As shown in FIG. 4, overwatch agent 400 may include an ingestion interface, a monitoring system, a machine learning system, and an alert system. While not illustrated in FIG. 4, additional components may be present. Examples of these components include, but are not limited to, memory (e.g., volatile memory and/or nonvolatile memory), processor(s) for executing processing instructions, and operating systems, data storage components (e.g., hard drive, flash memory, memory card, etc.), input and/or output interfaces, and/or the like.

Network traffic can be routed through ingestion interface 405 and consumed by components of the monitoring system (e.g., real-time detection module 410 and/or off-line detection module 415). Over time, machine learning system can create baseline models of the network traffic which can be used to classify various threats. As illustrated in FIG. 4, pre-processing and parsing engine 425 can parse the traffic into a desired format. Training engine 430 can use training data to identify a classification model which can be tested or validated using testing engine 440. Then, prediction engine 450 can be used to classify traffic (e.g., a threat or as safe). The network model can be stored in model data database 455 and any identified threat vectors can be stored in database 460. The alert system can include communication interface 465 to transmit any recommendations generated by recommendation engine 470.

Figure 5:
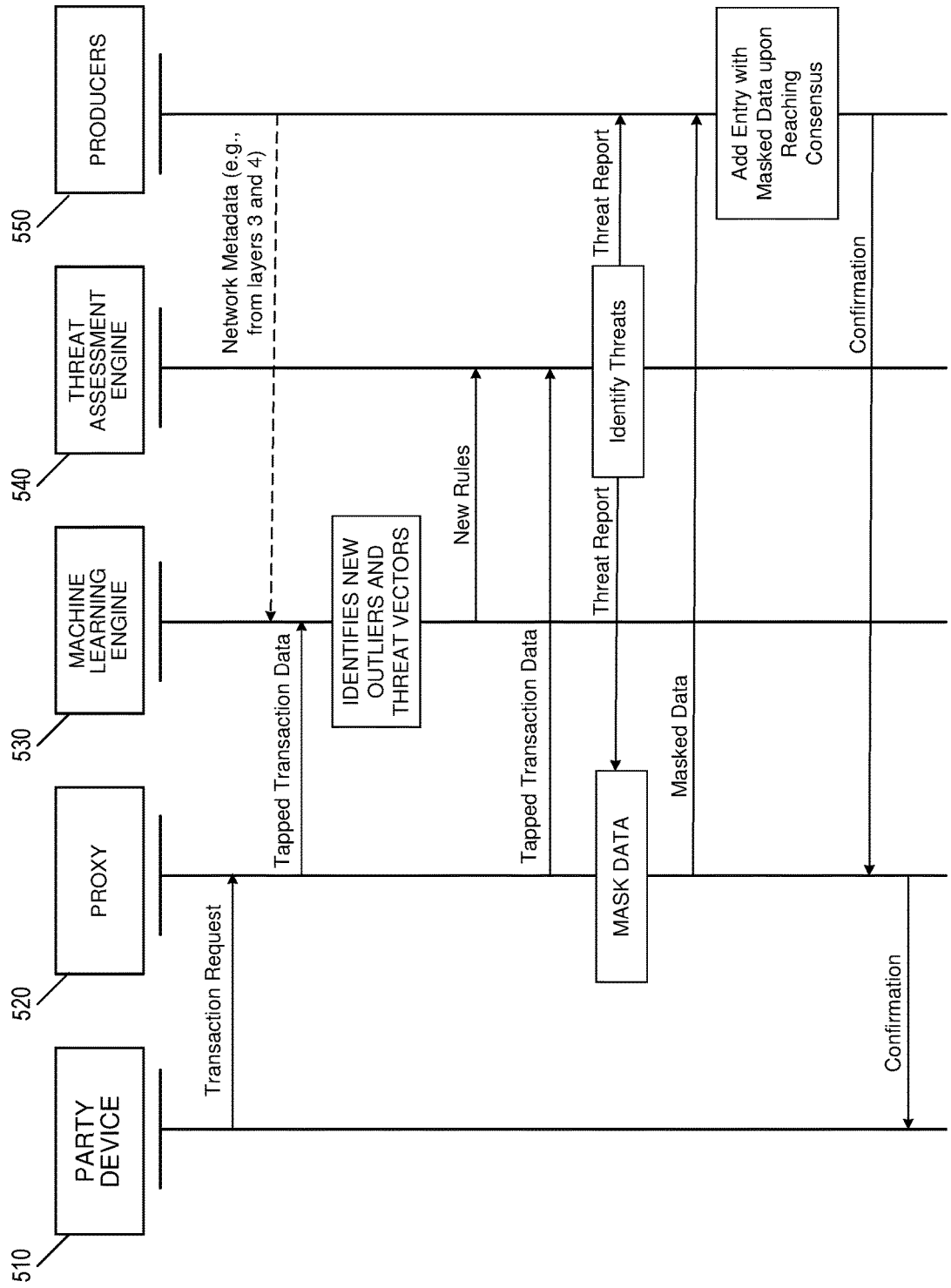
FIG. 5 is a sequence diagram illustrating an example of the data flow between various components of a secured system according to various embodiments of the present technology.

FIG. 5 is a sequence diagram illustrating an example of the data flow between various components of a secured system according to various embodiments of the present technology. In the embodiments illustrated in FIG. 5, party device 510 can submit a transaction request. The transaction request can be routed to proxy 520 and transaction data can be tapped and ingested by machine learning engine 530 and threat assessment engine 540. The transaction data can be analyzed by machine learning engine 530, and any outliers or threat vectors can be identified. If these outliers or threat vectors are new, machine learning engine 530 can submit new rules to threat assessment engine 540. Machine learning engine 530 may also receive network metadata (e.g., from layers 3 and 4). This additional information can be used in some embodiments to help identify outliers and new threat vectors.

Threat assessment engine 540 can be analyzing the transaction data to identify any new threats. As threats are identified, a threat report can be submitted to producers and proxy 520. If the threat assessment engine 540 reports that no threats are present, then proxy 520 can submit the masked data to producers 550 where an entry can be added to the ledger upon a consensus by multiple producers. A confirmation can be sent back to proxy 520 and party device 510.

Figure 6:
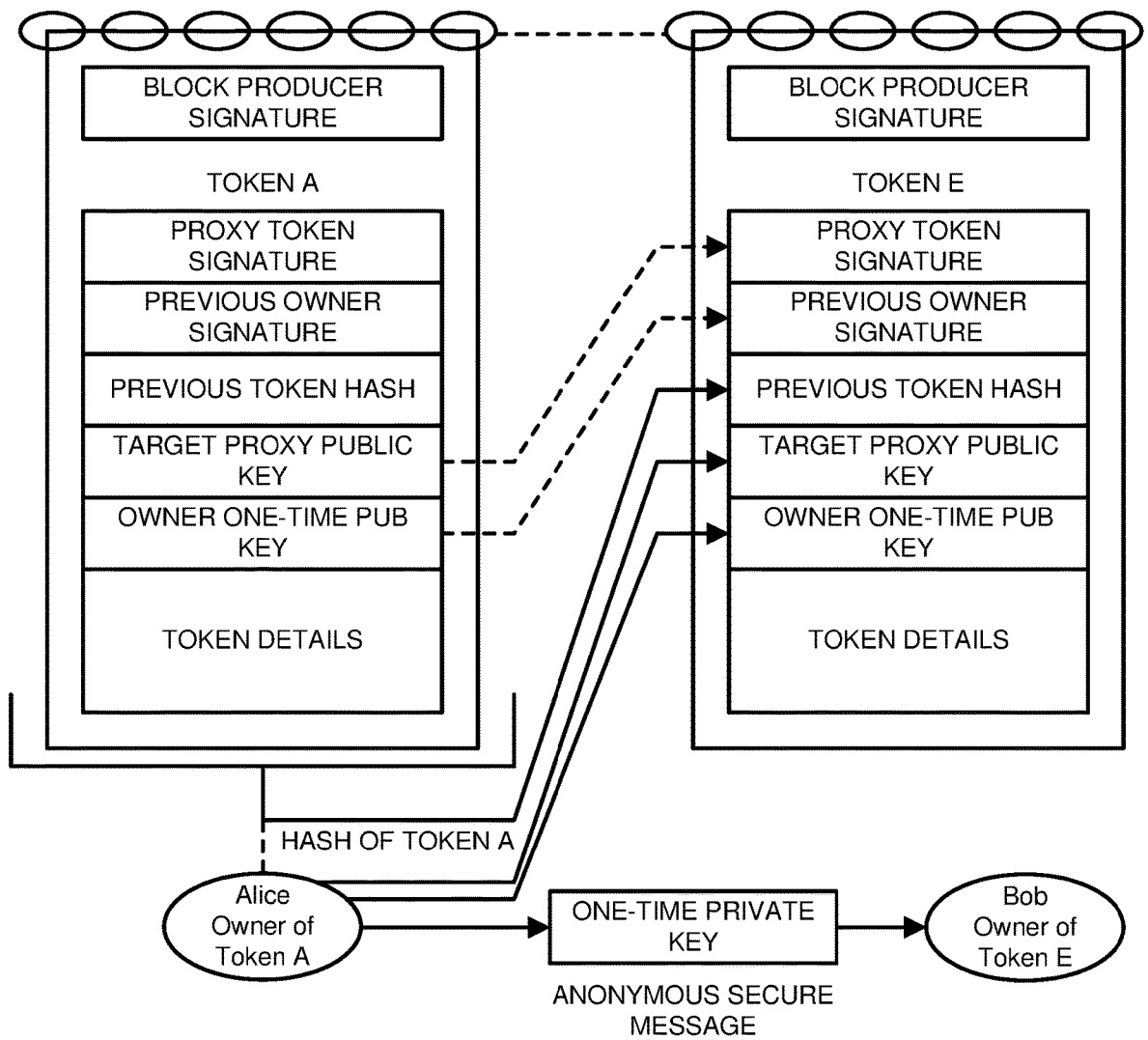
FIG. 6 illustrates an example of a multi-signature token transfer between anonymous users in accordance with some embodiments of the present technology.

FIG. 6 illustrates an example of a multi-signature token transfer between anonymous users in accordance with one or more embodiments of the present technology. In accordance with various embodiments, payments can be made using the blockchain's transaction format or using contracts/tokens. Since the blockchain expects identifiable endpoints for payments, the proxy gateway can be used as the visible payment identity while representing the users on its anonymous network. Payments can be signed by the proxy identity and its registered anonymous client (Multisig). Using the second signature, the anonymous users can direct the proxy to make payments on their behalf. This prevents the proxy from spending the funds on its own. When transfers are made, the transfers can be made to a second contract with conditions set by the initial contract owner. Thus, the second contract can only be fulfilled with those conditions, and the conditions are sent to the target recipient via the anonymous messaging system.

In addition, the anonymous users can direct the proxy to include other signatories to the transaction. The other signatories may consist of proxies and/or other anonymous users. In some embodiments, the transactions can be configured to assign weightings to signatories as well as logical AND/OR functionality. This decentralizes the proxies and allows users to fulfill their contracts via more than one proxy.

The token representation in FIG. 6 is notional and is only used to explain the anonymous payment method that may be used in some embodiments. When Alice, owner of token A (FIG. 6), wishes to make a payment, she generates a one-time public/private key pair and stores the public key in a new token (token E).

Alice will send the private key, or information on how to derive the private key, immediately or later, to the token E beneficiary (Bob) in a secure anonymous message. Alice includes, in token E, Bob's proxy's public key, a hash of token A (including a reference to token A), and other token details such as the coin amount, contract conditions, and possibly an encrypted message for Bob. Alice signs token E using the one-time private key that was sent anonymously to her by her previous benefactor. The new token E information can now be sent to Alice's proxy in a secure, anonymous message.

Alice's proxy will then generate a hash of token A (referenced in the new token E) and verify that it matches the hash Alice included in token E. Alice's proxy then verifies Alice's signature using the one-time public key from token A, and checks that token A's amount matches the amount in token E. If the signature and token amount are verified, Alice's proxy signs the new token E and forwards it to the block producer for inclusion in the ledger.

Double-spend checking can be done at the block producer level. As mentioned above, the one-time private key may or may not be known to the payer. In the case where it is known to the payer, the transaction can only be reversed before the intended beneficiary transfers the amount into another contract. The one-time public and private keys can be generated normally, where both keys are known to the generating party, or they can be generated using stealth techniques, whereby the destination private key cannot be determined by Alice. In the former case, Alice has the option of reversing the payment and it can only be fully owned by Bob through a second self-payment. In the latter case, instead of a private key, a stealth computation is added in the secure message sent to the beneficiary. The stealth computation allows Bob to compute the private key (unknown to Alice). Some embodiments may allow the option of the beneficiary providing the "spend" public key.

If the transaction involves the exchange of electronic goods, then it is possible to construct an atomic transaction, whereby a time delay is imposed and both parties to the transaction have to provide a signature before the goods are released. This can also be done in an anonymous manner since the transaction would require both users to apply their anonymous, one-time key. In a variation of the example illustrated in FIG. 6, the previous owner's signature would just have to be applied within the same time delay.

Figure 7:
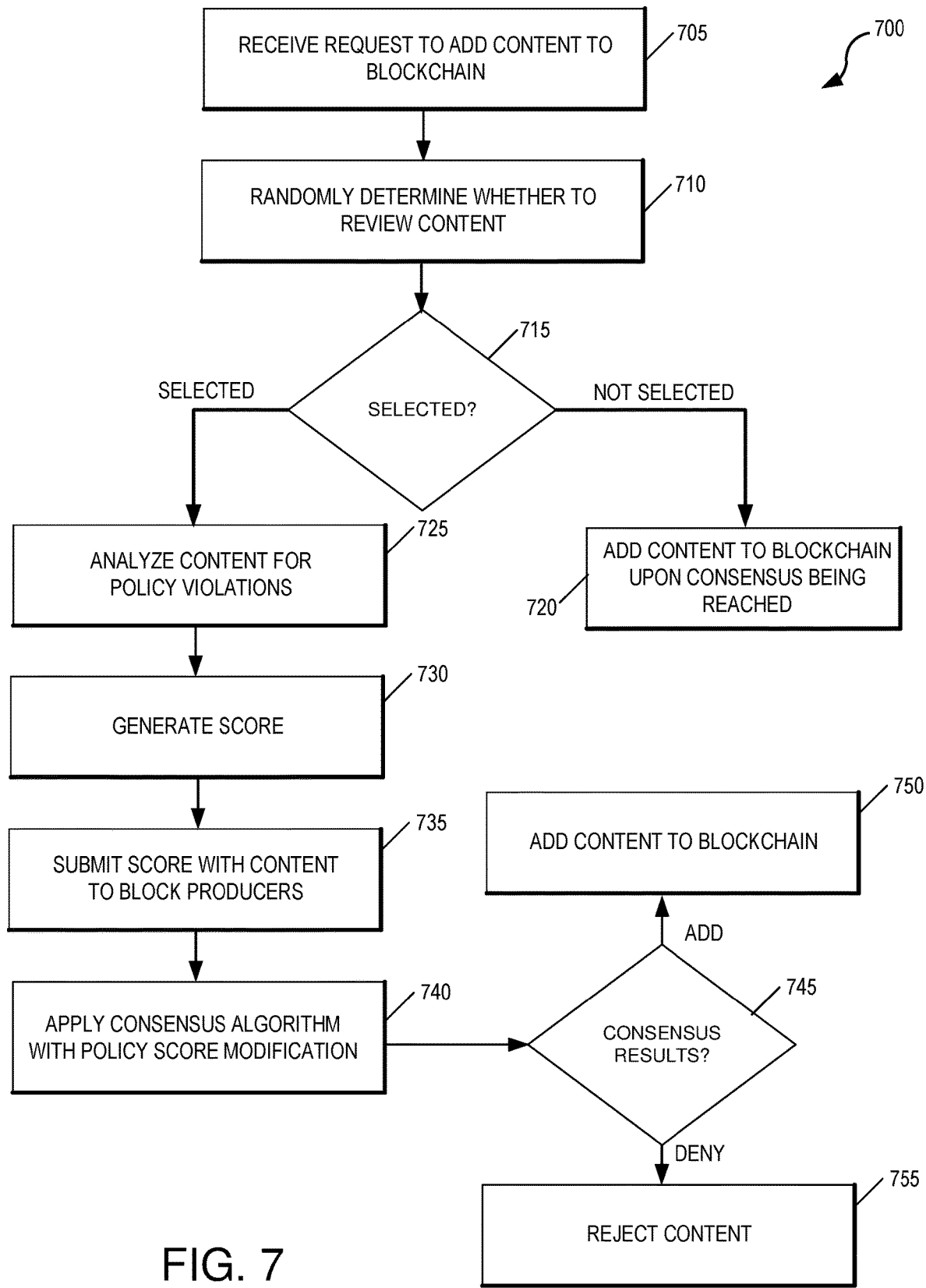
FIG. 7 is a flowchart illustrating an example of a set of operations for using a consensus algorithm that takes into account policy ratings when determining whether to add content to the blockchain in accordance with one or more embodiments of the present technology.

FIG. 7 is a flowchart 700 illustrating an example set of operations for using a consensus algorithm that takes into account policy ratings when determining whether to add content to the blockchain in accordance with one or more embodiments of the present technology. As illustrated in FIG. 7, receiving operation 705 receives a request to add content to the blockchain. Before the content is added to the block chain, selection operation 710 determines (e.g., based on a random selection) whether this request will be reviewed for policy violations. Determination operation 715 determines whether the request was selected. When determination operation 715 determines the request was not selected, determination operation 715 branches to addition operation 720 where the content is added once a consensus has been reached.

When determination operation 715 determines the request was selected, determination operation 715 branches to review operation 725 where the content is reviewed for poly violations. Generation operation 730 can take the results from review operation 725 and generate a score indicative of compliance of the content with policies in place. The score can be submitted with the content to the content producers during submission operation 735. Consensus operation 740 can apply a consensus algorithm with a policy score modification to determine whether the content should be added. For example, if the policy score is indicative of a compliance with the policies (e.g., a score that is below or above a threshold amount or percentage), then consensus operation 740 operates as normal whereas a policy score is indicative of a violation would cause the consensus algorithm to automatically fail. Determination operation 745 identifies the consensus results. When determination operation 745 determines that the content should be added, then determination operation 745 branches to addition operation 750 where the content is added. When determination operation 745 determines that the content should be denied, then determination operation 745 branches to refusal operation 755 where the addition of the content to the blockchain is rejected.

Figure 8:
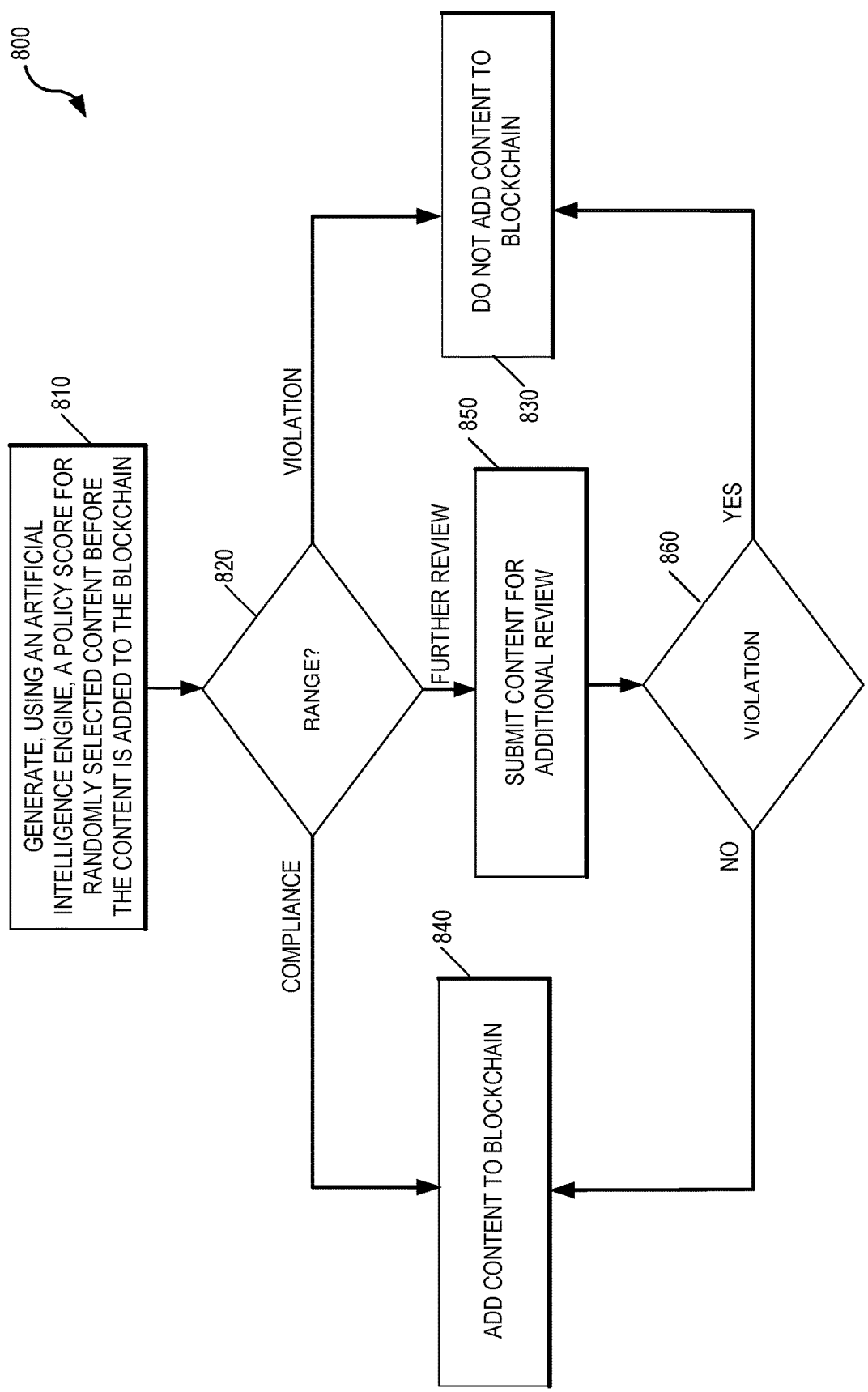
FIG. 8 is a flowchart illustrating an example of a set of operations for determining whether to add content to the blockchain in accordance with one or more embodiments of the present technology.

FIG. 8 is a flowchart illustrating an example of a set of operations 800 for determining whether to add content to the blockchain in accordance with one or more embodiments of the present technology. In the embodiments illustrated in FIG. 8, generation operation 810 uses an artificial intelligence engine to generate a policy score for randomly selected content before the content is added to the block chain. The artificial intelligence engine, in some embodiments, may use multiple specialized engines (e.g., that can run in parallel) to classify and/or score the content. For example, the artificial intelligence engine may include a copyright engine to identify copyrighted content (e.g., pictures), a misappropriations engine to identify information that may steal personal information (e.g., phone numbers, credit card numbers, social security numbers, etc.) for large groups of people, child pornography engine to identify indecent photographs of children, and the like. Each of these multiple specialized engines may be weighted and combined to generate an overall score (e.g., between 0 and 100).

Determination operation 820 determines whether the overall score is within a range indicating a violation, compliance, or a need for further review. When determination operation 820 determines the content is in violation, determination operation 820 branches to refusal operation 830 which acts as an override of the consensus algorithm and denies addition of the content to the blockchain. When determination operation 820 determines the content is in compliance, determination operation 820 branches to addition operation 840 where the content is added upon consensus from the consensus algorithm. When determination operation 820 determines that further review is needed, determination operation 820 branches to submission operation 850 where the content is submitted for additional review (e.g., by additional machine learning engines, classifiers, or human review). Violation determination operation 860 reviews the results from submission operation 850 and determines whether the content is in violation, in which case violation determination operation 860 branches to refusal operation 830, or whether the content is acceptable, in which case violation determination operation 860 branches to addition operation 840.

Figure 9:
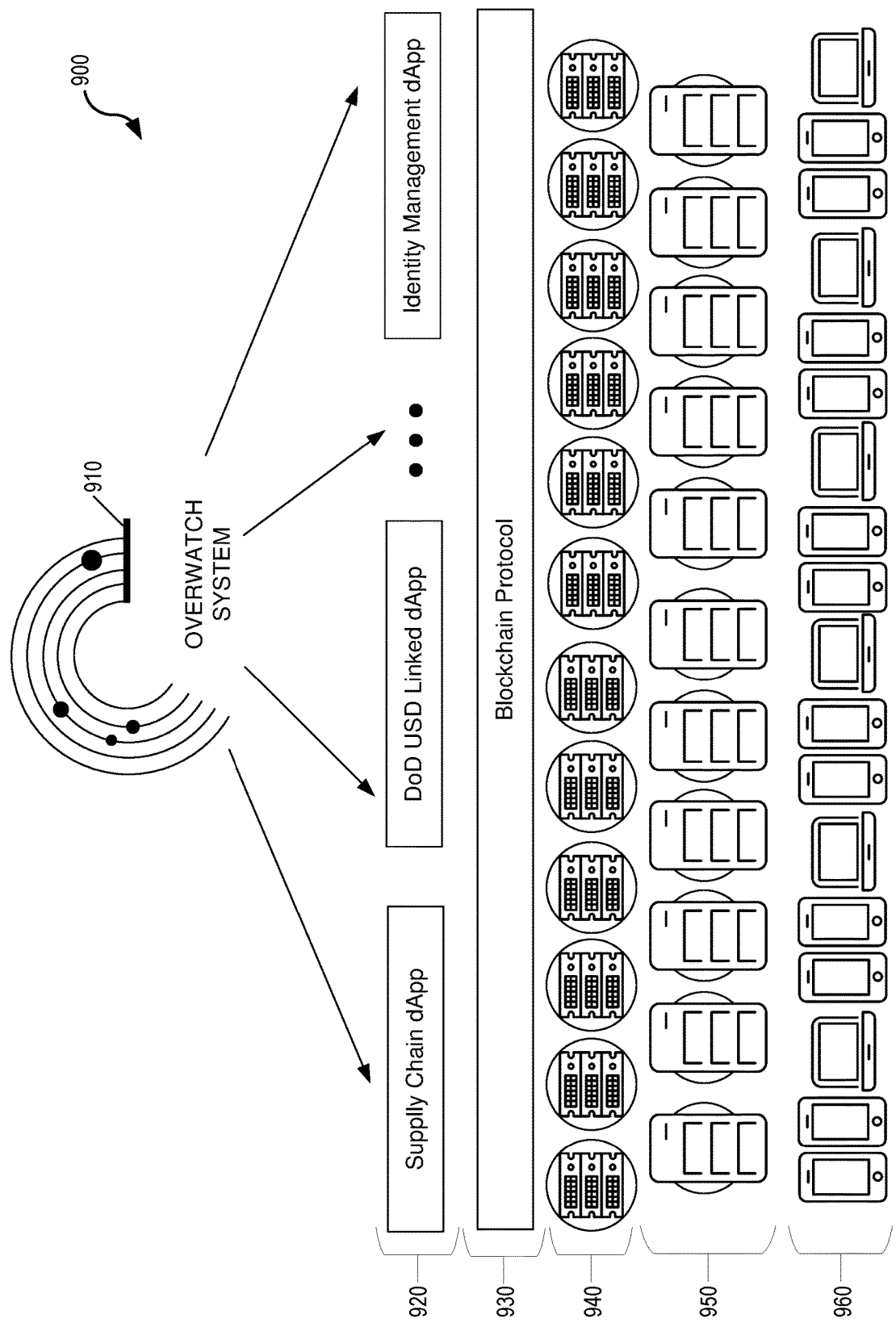
FIG. 9 illustrates an example of the various layers of a blockchain system that may be used in accordance with various embodiments of the present technology.

FIG. 9 illustrates an example of the various layers of a blockchain system 900 that may be used in accordance with various embodiments of the present technology. In the embodiments illustrated in FIG. 9, the system may include one or more overwatch agents 910, a layer of decentralized applications 920, a blockchain protocol layer 930, a layer of producers 940, a layer of proxies 950, and a layer of devices 960. Various embodiments of blockchain system 900 may include military grade encryption for secure transactions and cryptographic anonymity. Overwatch agents 910 can provide continuous security assessments against all cyber attacks in the ecosystem. Some embodiments may use big data analytics to monitor anonymity and anomaly detection. Some embodiments of the big data capability allow the system to search for actionable intelligence in peta-bytes of data put into counter mode. Continuous assessment of all blockchain data, plus additional sources to ensure blockchain data, remains uncorrelated.

Some embodiments of overwatch agents 910 will continuously assess the entire network for vulnerabilities. For example, every IP address can be assessed against 155,000 threat vectors continuously. This compares best in class commercial assessment of 90,000 threat vectors typically done once a year (US DoD Standard). Some embodiments can provide a variety of standard compliances (e.g., HIPAA, FINRA, DISA, PCI-DSS, etc.).

In some embodiments, the system may issue a set of coins (e.g., GuardianCoins) which can be utility tokens that are the path to accessing resources on the public blockchain. Examples of resources include, but are not limited to, bandwidth, RAM, CPU, and storage. dApp developers will "stake" their tokens and are granted access to resources (e.g., bandwidth, CPU and Storage) based on the amount of tokens staked. In some embodiments, RAM may be separate from all other resources because it is precious and could be gamed/speculated on. As such, dApp developers may be required to purchase RAM based on the rate the GuardianCoin Network software sets it at from an internal RAM market. The rate may be based on what the current supply of RAM is. The less RAM that's available to purchase, the higher the price is and the higher the incentive is to sell RAM if you aren't using it. Each time someone buys or sells RAM a 1% fee may be applied (to both sides of the transaction, meaning 2% total). Such a feature helps reduce speculation (the fee is ten times what a normal exchange would charge) and also serves to reduce the overall inflation as these fees collected are removed from circulation (e.g., burned).

Some embodiments may include a Protocol Service Pack as a Private Blockchain (Guardian Protocol) for customers to run within their own environments. In this implementation, Bandwidth, RAM, CPU, and Storage are provided by the customer and do not incur staking or purchasing using the tokens in the traditional way of a dApp. Use of dApps and the Private Blockchain are enabled through staking tokens which will cover software licensing and maintenance. This may be as an annual subscription or a perpetual licensing model.

In some embodiments, all messages received by the Messaging Server are copied to all anonymous users. Users can find their messages by cryptographically testing all received messages. As a result, monitoring the Anonymous network cannot determine the intended message recipients. Sending private messages can be monitored but the recipients cannot be determined. The messaging server can exist as part of the Proxy, but can also exist separately. In the latter case, the sender IP addresses can be hidden from the Proxy. In some embodiments, the Anonymous network can be extended in layers using Anonymous Proxy Servers, in which one layer hides recipients and a second layer could also hide senders. This is not the same as P2P or Onion network since it thwarts traffic analysis. Sender IP's can also be hidden in some embodiments by separating the messaging service from the proxy. In this case, the proxy receives its user instructions as a messaging client.

Figure 10:
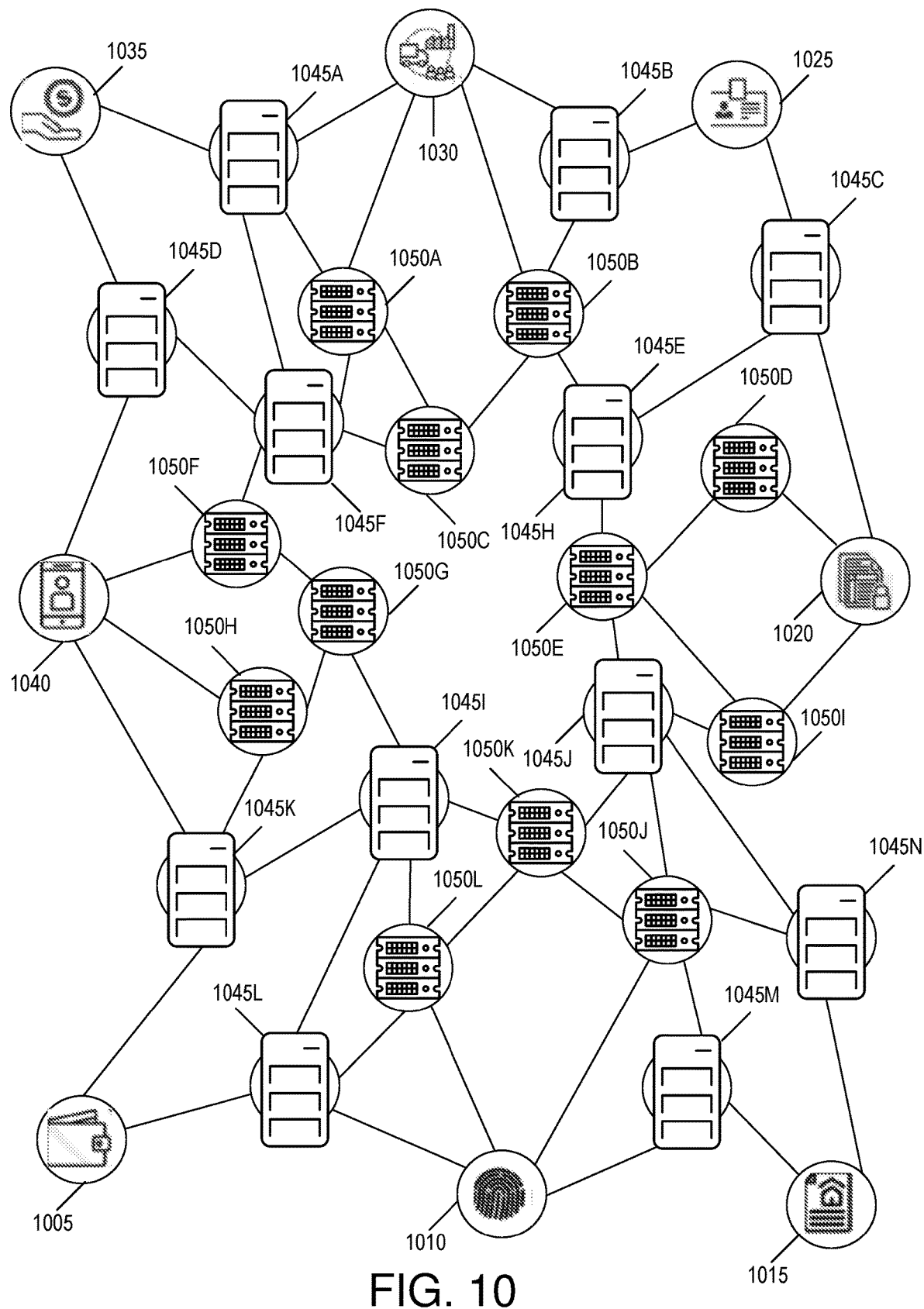
FIG. 10 illustrates an example of various decentralized applications that may be used in some embodiments of the present technology.

FIG. 10 illustrates an example of various decentralized applications that may be used in some embodiments of the present technology. As illustrated in FIG. 10, the system may include a variety of dApps such as, but not limited to, wallet dApp 1005, criminal record dApp 1010, land registry dApp 1015, classified document dApp 1020, identity management dApp 1025, supply chain dApp 1030, USD linked dApp 1035, secure communications dApp 1040, and/or other dApps. In addition to the dApps the system may include proxies 1045 and block producers 1050.

Various embodiments of the ecosystem provide a wallet dApp 1005 that can be a hub for each account holder to send and receive payments of tokens, attachments, messages, and the like while ensuring that users remain anonymous and the data encrypted and secure. Some embodiments of the wallet 1005 can have a decentralized, yet non-distributed, audit capability to ensure that the blockchain for messaging is used appropriately. Any image or message that is to be uploaded to the blockchain can be first analyzed locally on the account holders' device in some embodiments. If that image or message is deemed inappropriate by the software, the wallet may not upload that content and advise the account holder of the same. This localized gatekeeper functionality may not at any time send messages or images for any centralized review, and this will be capable of being validated easily by a user capturing their own data traffic.

In some embodiments, the analysis may utilize machine learning algorithms, that have been taught centrally, deployed locally, and contained locally on remote devices, which can structure unstructured data for local analysis to reach a determination of appropriateness. In this way, various embodiments can defeat the problems of content that are universally deemed to be inappropriate and that have plagued Bitcoin. Embodiments may also be able to mitigate the "death squad" issues that would come with total anarchy. It should be expected that this vetting capability will not be fool-proof and there is a chance some legitimate content will be blocked and vice versa.

Criminal record dApp 1010 can link to governmental criminal records and may provide access to authorized personnel. Various embodiments of criminal record dApp 1010 would allow law agencies to access certain criminal records between agencies ensuring the records have not been tampered (e.g., immutable records). In accordance with some embodiments, dApp 1010 may allow the overwatch agent (or other component) to recognize bad characters within the blockchain (e.g., cross-reference known criminals). As such, those who may be attempting to tamper or hack the system causing certain damage to the blockchain or specific records can be more easily identified.

Similarly, land registry dApp 1015 can link to property records and create a portal for accessing these records. In accordance with some embodiments, land registry dApp 1015 is geared towards facilities management in either the public or private sectors. As such, the records in the blockchain would again ensure the records or specific attributes are not changed, or if they are, they have a record (paper trail) of such updates to the record.

Classified document dApp 1020, may contain a smart contract with restrictive access (security clearance) capability that could be created for access to data files. A smart contract for a classified government document might allow access only if two keys are presented at the same time: the user's key and an NSA system key. Even if a future data hack occurs, the hacker would not be able to view the stolen documents without the keys from intended parties. It is estimated that with the world's computing power it would take nearly 40 years to brute-force decode a single message and each message is uniquely keyed.

Identity management dApp 1025 can allow companies, governmental agencies, and other entities to create, distribute, and even link a variety of identifiers to a single user. For example, some embodiments of the present technology can utilize blockchain to provide radical efficiencies in identity management, enabling government to create a single collection of identity and authentication documents that can be used across departments. From issuing passports and national ID cards to national health insurance/social security numbers and tax payer IDs, establishing and verifying identity is critical to both Governments and their citizens. A blockchain can provide radical efficiencies in these areas, enabling government to create a single collection of identity and authentication document that can be used across departments. These records from personal identification, licenses, and property rights that can be made available to authorized users of the blockchain, such as tax authorities, the police, and hospitals. The dual aspects of privacy and availability are vital to protect personal information and make it available instantly only to the right departments when needed, benefitting both the citizen and government alike.

Supply chain dApp 1030 can allow a user to identify an object's precise location within the supply chain, and its accompanying digitized documentation can be made part of a traceable permanent record. This can reduce uncertainty and increase ability to plan for infrastructure needs, even with lean budgets.

USD linked dApp 1035 can provide a secure record of currency fluctuations. In accordance with some embodiments, dApp 1035 may be useful in the area of monetary policy. The fluctuations of a currency (e.g., USD) may be represented in real or digital currency, or digital currencies directly backed by USD. The blockchain would capture each fluctuation in the currency based on some type of internal or external trigger. The capture of such currency changes, and the capture is timestamped at a very high level of accuracy—milliseconds or even nanosecond resolution, may ensure certain currency manipulation is not occurring. In some embodiments, the dApp can be be used to peg one currency to another regardless of the currencies (e.g., USD, digital, etc). Time resolution may also be used to allow the currencies to be pegged given their values at a specific time.

Transacting anonymously and securely still requires communication between the transacting parties. As such, some embodiments use military grade messaging platforms and secure communications dApp 1040 to allow for a truly decentralized network. Traditional government-grade messaging systems originally held their encryption keys centrally, which can be viewed as a weak point for institutions that are unable to protect their encryption keys properly. Voice and messaging communication suites in various embodiments of the present technology can use decentralized key management, in effect the handset creates a session key on an as needed basis. Some embodiments also provide for a protocol to provide for fully decentralized, anonymized and encrypted messaging and voice calls. As such, since transacting often requires communication between the parties, various embodiments of the present technology provide a decentralized messaging capability allowing those parties to have the same level of anonymity and encryption in their communications as they do with their payments.

Verticals

Most industries require some levels of privacy, and in many cases this is mandatory. This may range from the protection of Intellectual Property and competitive advantage, to industry best practice or legal requirements. When one considers industries such as healthcare, finance, and Government, to name but a few, the argument for security and privacy becomes overwhelmingly convincing.

Healthcare

In the US, administrative spending accounted for nearly 15% of all healthcare spending in 2016 and it is estimated that two-thirds of these costs are related to billing and insurance. For example, insurance companies require care providers to gain authorization before commencing many expensive treatments. This often means completion of an authorization form and sending it to the insurance company who will manually review the application and decide whether to seek more information, approve, or reject the claim.

In this way, care providers and insurance companies spend between $23 bn-$31 bn annually processing treatment pre-authorizations alone and the implications of tackling these types of efficiency improvement through blockchain are manifestly substantive. Once approved, the time it takes to settle a healthcare claim and the determination and tracking of any deductibles and co-payments are also a major source of cost and pain. Some embodiments may utilize a smart contract dApp that could reduce the time needed for healthcare claim processing from 7-14 days to under 15 minutes.

The smart contract within the dApp can include detailed logic that represents payer/provider contract terms, and as soon as the claim is submitted it could be processed in real-time and payment transmitted to the provider. In addition, various embodiments of the blockchain ecosystem could: 1) introduce overall efficiency and transparency into this heavily siloed industry by enabling governmental agencies, insurance companies, hospitals, doctors, clinics, and patients to use a common blockchain; 2) allow health providers to share networks without compromising data privacy, security, or integrity; and/or 3) manage the lifecycle of patient records via blockchain.

As one of the most privacy-sensitive data domains, this sector has a unique set of regulatory requirements related to privacy protections, primarily laid out in the U.S. under the Health Insurance Portability and Accountability Act (HIPAA) from 1996. Various embodiments of the present technology can meet these requirements through cryptographic anonymity privacy techniques and the ability to create Smart dAPPS with security and privacy at their core. Plus, the safeguards from various embodiments of the overwatch capability will make the system fully H IPAA compliant.

Financial

Banks and other financial institutions have been looking at many ways in which blockchains can improve sectors which present significant inefficiencies concerning their clearing processes, operational or administrative functions, and preventing fraud. For example, some embodiments can be used as follows:

Share certificates—The administrative process of tracking the transfer of private company shares can be manual, expensive, subject to errors and can expose issuers to regulatory risks. A blockchain and a smart contract dApp could track trading and ownership of private company shares.

Loans—Average settlement time for secondary trading of syndicated loans is around one month, given that the process is mostly manual and involves multiple counterparties. A blockchain dApp could facilitate faster clearing and settlement of loans and reduce manual reviews, data re-entry, and reconciliation.

Customer Identification—Know your customer (alternatively know your client or 'KYC') is the process of a bank identifying and verifying the identity of its clients and anti-money laundering regulations which governs these activities. Banks are increasingly demanding that customers provide detailed anti-corruption due diligence information. Banks and financial institutions often employ multiple systems to manage customer identification, adding complexity for both customers and employees. This makes identity validation to support customer (KYC) compliance arduous and repetitive. Various embodiments of the present technology can consolidate all identification documents to improve client satisfaction, decrease duplicate information and ease administrative effort.

Banking is heavily regulated to ensure privacy for some of the most sensitive data for most individuals, and the compromise of this data can have devastating consequences. Together with the U.S. Securities and Exchange Commission, the Financial Industry Regulatory Authority (FINRA) regulates securities firms carrying out business in the United States. There are similar regulations globally.

Protection of financial and personal customer information is a key responsibility and obligation of FINRA member firms. In the United States, broker and dealers must have written policies and procedures in place to address the protection of customer information and records. As detailed in FINRA's NASD Notice to Members 05-49 (Safeguarding Confidential Customer Information), the policies and procedures must be reasonably designed to:

ensure the security and confidentiality of customer records and information;

protect against any anticipated threats or hazards to the security or integrity of customer records and information; and protect against unauthorized access to or use of customer records or information that could result in substantial harm or inconvenience to any customer.

Banks and other financial organizations also need to demonstrate compliance with the Payment Card Industries Data Security Standards (PCI-DSS). To date, this type regulatory control and sensitivity of banking data has restricted the ability of banks to embrace blockchains as they would like, as the inherent transparency of blockchain and the networks on which hey rest are incompatible with the need to safeguard personally identifiable information (PII) and trade strategies.

While blockchain may help facilitate transparency from a technological perspective, financial organizations will seek to keep proprietary transactional and position information anonymous and private, for competitive reasons. Additionally, Network Security is a critical consideration for a blockchain network, particularly given the distributed nature of the network and the potential participation from entities across the globe. This is a major challenge for blockchain networks.

Market participants are likely to require assurances that the network is protected from external threats before joining, given that they may be providing private information and engaging in financial transactions within the network. As with HIPAA for Healthcare, various embodiments ensure the blockchain is PCI-DSS and FINRA compliant.

Governmental

Governments across the globe are looking into blockchains to facilitate, streamline and improve efficiency in many areas and there are multiple use cases for a secure Government blockchain. For example:

Identity Services: From issuing passports and national ID cards to national health insurance/social security numbers and tax payer IDs, establishing and verifying identity is critical to both Governments and their citizens. A major pain point though is the financial and personnel cost associated with positive and stringent identity services. In a large part this is due to the difficulty in linking data from siloed departments, where that information may be in differing formats from various sources, and the potential conflicts that can arise. A blockchain can provide radical efficiencies in these areas, enabling government to create a single, collection of identity and authentication documents that can be used across departments. These records from personal identification, licenses and property rights that can be made available to authorized users of the blockchain, such as tax authorities the police and hospitals. The dual aspects of privacy and availability are vital to protect personal information and make it available instantly only to the right departments when needed, benefitting both the citizen and government alike.

Land and property registry: Land and other government registries are essential to ensure smooth property transactions, establish liability, validate tax records, and verify ownership in legal cases. Inefficiencies in government processes in this area, due the fact the registry processes are paper-based and siloed, leads to repetitive and error-prone data which is vulnerable to tampering. The use of a standardized system based on blockchain can not only increase efficiencies and a reduction in time to process, but also reduce the number of intermediaries require and increase trust in public trust in identities of transacting parties in centralized, publicly held records. However, such information must remain private between the owner of a property, for instance, and the government, in much the same way as a citizen would not expect their tax filings to be made public by the tax authorities. Applying privacy and anonymity to blockchain transactions will enable this and allow the capture the entirety of the real estate or any other title transaction.

Social Security: A secure blockchain could solve two important issues in social security payments. First, there is the physical payment by the government and for the recipient the collection of that social security payment; for example, in South Africa the government will send armored vehicles to townships to hand out social security payments in cash. However, nearly all such recipients have smartphones and payments could be distributed using this platform. Secondly, the blockchain could provide an unchangeable historical record of every social security transaction. This can be secure for the recipient but allow the government, with the appropriate permissions, to create a powerful audit tool. Many governments are investigating the use of blockchain for such applications, but few have been able to address the privacy and security implications that arise.

Information to be shared between social security recipients and the government can be highly sensitive (e.g. medical records, case notes, personal identification documents). Building privacy and anonymity into the blockchain technology can provide for a secure means for protecting the information stored within the distributed network and determining how and when it is used and/or shared with an immutable audit of when that data was accessed and by whom.

Various embodiments can provide a fully decentralized system with no central switch or stack. As opposed to securing a centralized switch in, for example, a Top-Secret environment, this fully decentralized system could offer not only better security (particularly for nations with lower grade infrastructure), but also a reduction in risk that the system could go down, or suffer hacking attempts and denial of service attacks. Its centralized system would be decentralized across potentially hundreds of proxy servers in the ecosystem of the present technology.

Accounts Payable

Much of the work performed by accounts payable teams stems from having inconsistent data between the supplier and the buyer. A blockchain provides a single version of the truth for both the supplier and buyer. Reduced risks, on-time payments and improved working capital. With shared access to one consistent version of the truth, account reconciliation and inquiries could become obsolete. Therefore, cycle times could also be expedited from days to minutes, enabling buyers o offer earlier payment programs to their suppliers and help ensure that payments are managed according to the payment terms.

Fewer disputes and associated benefits such as verifiable and auditable ledger systems can mean fewer risks for suppliers and customers. With access to enterprise blockchains, suppliers could gain visibility into the blockchain platform, verify the payment status and ensure timely payments. And it's not only the Accounts Payable function in an organization that can be dramatically optimized through the use of blockchains, this can extend to the entire supply chain as well:

> From raw materials to distribution to after-sale support, understanding the location and flow of products within an organization supply chain is critical—and not only for maximizing efficiency.
>
> Consumers demand transparency on where and how products are made and regulators around the world require information about supply chains—with penalties for noncompliance.
>
> Beyond the need for information, complex supply chains depend on trust to function properly. But distrust between organizations has historically discouraged them from sharing or relying on shared data.

Blockchain solutions can remedy that with a shared, permissioned record of ownership, location and movement of parts and goods. That shared record can increase efficiency, transparency and trust for any business. Disparate record-keeping and reporting systems can lead to scattered, incomplete and unreliable manifests, bills of lading, certifications, etc. In addition, supply chain intelligence is knowing more than where goods are at any given moment. To find the source of flawed parts or component failures, being able to trace the origin and provenance of previously shipped goods is critical. With blockchain-stored records, all relevant information can be simultaneously and securely available to sender, receiver, shipper and regulators and these records reflect a product's geographic flow and how it was treated. With a blockchain you can examine sources, investigate industry certifications, track restricted or dangerous components, discover storage condition anomalies and more.

While a blockchain ledger can solve a large number of accounts payable and supply chain problems, transparency to the degree that anyone can follow a company's purchases, or the flow of its supply chain can lead to a lack of competitive advantage and worse. This is a critical issue for weak blockchain code on a weak network. For example, if anyone could explore Apple's supply chain and could see that it is suddenly sourcing 5-inch OLED panels and knew where they were coming from, the secrecy around its new iPhone would be destroyed. It would give Apple's competition plenty of time to match (or improve on) the features of the new product and any first mover advantage would be lost. While commercially this would be a major issue, imagine the advantages to a nation such as Russia or China, studying the USA's defense supply chain. Various embodiments of the present technology provide a needed solution.

Exemplary Computer System Overview

Aspects and implementations of the overwatch ecosystem of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 11:
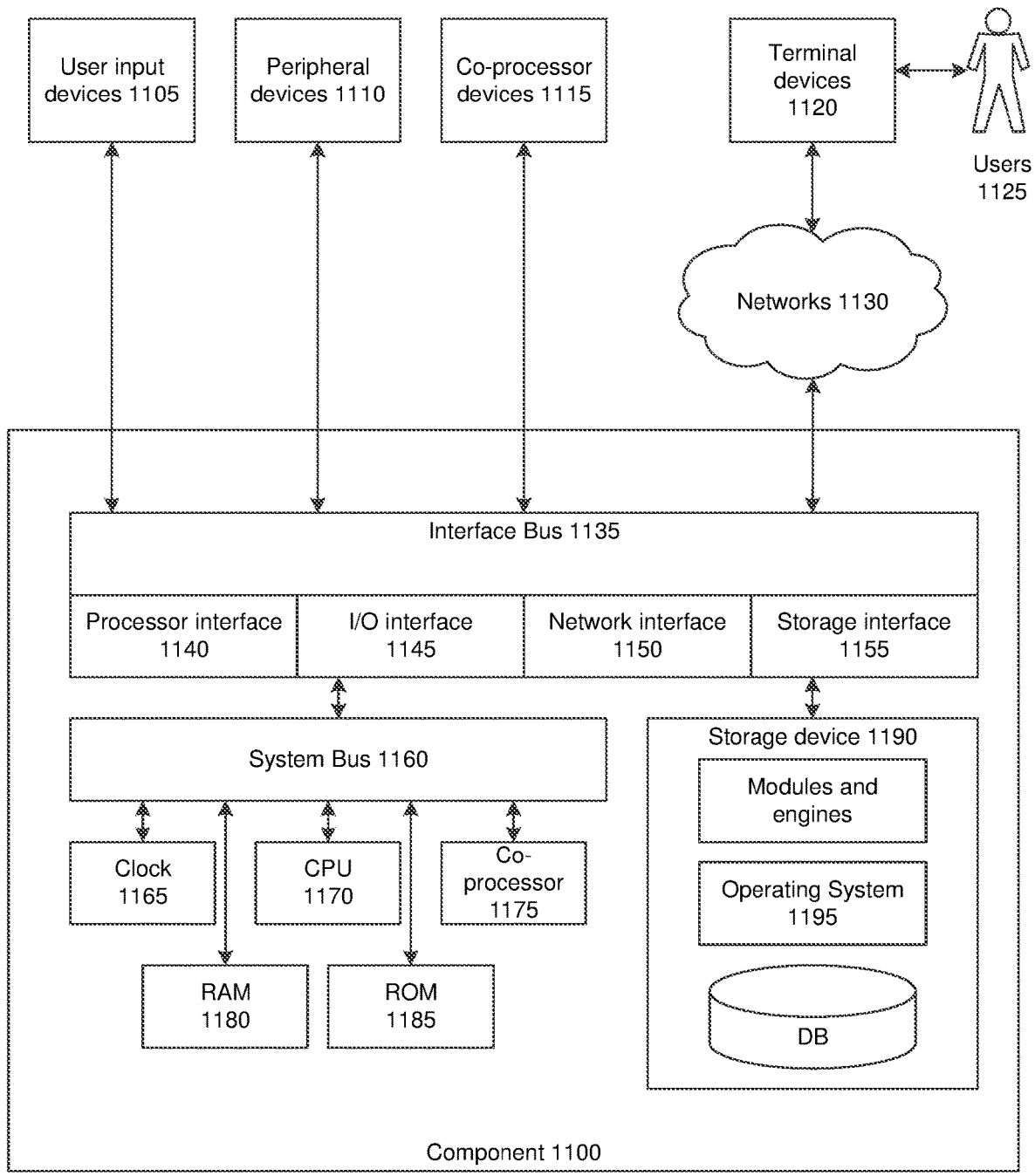
FIG. 11 is an example of a computer systemization that may be used in various embodiments of the present technology.

FIG. 11 is a block diagram illustrating an example machine representing the computer systemization of various components of the overwatch ecosystem. The component 1100 may be in communication with entities including one or more users 1125 client/terminal devices 1120 (e.g., devices 110A-110N), user input devices 1105, peripheral devices 1110, an optional co-processor device(s) (e.g., cryptographic processor devices) 1115, and networks 1130 (e.g., 120 and 130 in FIG. 1). Users may engage with the component 1100 via terminal devices 1120 over networks 1130.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The component 1100 may include clock 1165, CPU 1170, memory such as read only memory (ROM) 1185 and random access memory (RAM) 1180 and co-processor 1175 among others. These subcomponents may be connected to a system bus 1160, and through the system bus 1160 to an interface bus 1135. Further, user input devices 1105, peripheral devices 1110, co-processor devices 1115, and the like, may be connected through the interface bus 1135 to the system bus 1160. The interface bus 1135 may be connected to a number of interface adapters such as processor interface 1140, input output interfaces (I/O) 1145, network interfaces 1150, storage interfaces 1155, and the like.

Processor interface 1140 may facilitate communication between co-processor devices 1115 and co-processor 1175. In one implementation, processor interface 1140 may expedite encryption and decryption of requests or data. Input output interfaces (I/O) 1145 facilitate communication between user input devices 1105, peripheral devices 1110, co-processor devices 1115, and/or the like and components of the component 1100 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1150 may be in communication with the network 1130. Through the network 1130, the component 1100 may be accessible to remote terminal devices 1120. Network interfaces 1150 may use various wired and wireless connection protocols such as, direct connect, Ethernet, wireless connection such as IEEE 802.11a-x, and the like.

Examples of network 1130 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1150 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1155 may be in communication with a number of storage devices such as, storage devices 1190, removable disc devices, and the like. The storage interfaces 1155 may use various connection protocols such as Serial Advanced Technology Attachment (SATA), IEEE 1394, Ethernet, Universal Serial Bus (USB), and the like.

User input devices 1105 and peripheral devices 1110 may be connected to I/O interface 1145 and potentially other interfaces, buses and/or components. User input devices 1105 may include card readers, finger print readers, joysticks, keyboards, microphones, mouse, remote controls, retina readers, touch screens, sensors, and/or the like. Peripheral devices 1110 may include antenna, audio devices (e.g., microphone, speakers, etc.), cameras, external processors, communication devices, radio frequency identifiers (RFIDs), scanners, printers, storage devices, transceivers, and/or the like. Co-processor devices 1115 may be connected to the component 1100 through interface bus 1135, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The component 1100 may employ various forms of memory including on-chip CPU memory (e.g., registers), RAM 1180, ROM 1185, and storage devices 1190. Storage devices 1190 may employ any number of tangible, non-transitory storage devices or systems such as fixed or removable magnetic disk drive, an optical drive, solid state memory devices and other processor-readable storage media. Computer-executable instructions stored in the memory may include one or more program modules such as routines, programs, objects, components, data structures, and so on that perform particular tasks or implement particular abstract data types. For example, the memory may contain operating system (OS) component 1195, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The component 1100 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the component 1100 may be distributed electronically over the Internet or over other networks (including wireless networks). Those skilled in the relevant art(s) will recognize that portions of the overwatch ecosystem may reside on a server computer, while corresponding portions reside on a client computer. Data structures and transmission of data particular to aspects of the component 1100 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
   receiving, at a proxy, a transaction from a first endpoint within multiple endpoints associated with the proxy;
      wherein the transaction includes transaction data and a request to add the transaction to a distributed ledger system; and
      wherein the transaction data include personally identifiable information;
   masking the personally identifiable information using a private key;
   randomly selecting a block producer from multiple block producers to verify the transaction;
   routing the transaction to the randomly selected block producer for validation; and
   creating a tap to route a copy of the transaction to an overwatch agent;
      wherein the overwatch agent uses machine learning to classify the transaction.

2. The method of claim 1, further comprising:
   receiving, at the proxy, a transaction confirmation from the block producer; and
   distributing the transaction confirmation to all the multiple endpoints associated with the proxy.

3. The method of claim 2, wherein the transaction confirmation is encrypted using the private key and each of the multiple endpoints attempts to decrypt the transaction confirmation.

4. The method of claim 1, wherein the overwatch agent is configured to:
   receive a copy of network traffic;
   monitor the copy of the network traffic to identify threats;
   create a baseline network model of the copy of the network traffic; and
   communicate threats identified to the proxy or multi-ledger system.

5. The method of claim 1, further comprising monitoring a traffic level between the proxy and the multiple block producers and, upon identifying the traffic level has fallen below a threshold, automatically creating artificial traffic between the proxy and the multiple block producers.

6. The method of claim 1, wherein the transaction includes cryptocurrency transactions.

7. A storage device having stored thereon instructions that, when executed by one or more processors, cause a machine to:
   receive, at a proxy, a transaction from a first endpoint within multiple endpoints associated with the proxy;
      wherein the transaction includes transaction data and a request to add the transaction to a distributed ledger system; and
      wherein the transaction data include personally identifiable information;
   mask the personally identifiable information using a private key;
   randomly select a block producer to verify the transaction;
   route the transaction to the randomly selected block producer for validation; and
   create a tap to route a copy of the transaction to an overwatch agent;
      wherein the overwatch agent uses machine learning to classify the transaction.

8. The storage device of claim 7, wherein the instructions, when executed by the one or more processors, further cause the machine to:
   receive, at the proxy, a transaction confirmation from the block producer; and
   distribute the transaction confirmation to all the multiple endpoints associated with the proxy.

9. The storage device of claim 8, wherein the transaction confirmation is encrypted using the private key and each of the multiple endpoints attempts to decrypt the transaction confirmation.

10. The storage device of claim 7, wherein the instructions, when executed by the one or more processors, further cause the machine to monitor a traffic level between the proxy and the block producer and, upon identifying the traffic level has fallen below a threshold, automatically create artificial traffic between the proxy and the block producer.

11. The storage device of claim 7, wherein the transaction includes a cryptocurrency transaction.

12. A system comprising:
   means for receiving a transaction from a first endpoint within multiple endpoints associated with a proxy;
      wherein the transaction includes transaction data and a request to add the transaction to a distributed ledger system; and
      wherein the transaction data include personally identifiable information;
   means for masking the personally identifiable information using a private key;
   means for randomly selecting a block producer from multiple block producers to verify the transaction;
   means for routing the transaction to the randomly selected block producer for validation;
   means for creating a tap to route a copy of the transaction to an overwatch agent; and
      wherein the overwatch agent includes means to classify the transaction.

13. The system of claim 12, further comprising:
   means for receiving, at the proxy, a transaction confirmation from the block producer; and
   means for distributing the transaction confirmation to all the multiple endpoints associated with the proxy.

14. The system of claim 13, wherein the transaction confirmation is encrypted using the private key and each of the multiple endpoints attempts to decrypt the transaction confirmation.

15. The system of claim 12, wherein the overwatch agent includes:
- means to receive a copy of network traffic;
- means to monitor the copy of the network traffic to identify threats;
- means to create a baseline network model of the copy of the network traffic; and
- means to communicate threats identified to the proxy or multi-ledger system.

16. The system of claim 12, further comprising means to monitor a traffic level between a proxy and the multiple block producers and, upon identifying the traffic level has fallen below a threshold, automatically create artificial traffic between the proxy and the multiple block producers.

17. The system of claim 12, wherein the transaction includes cryptocurrency transactions.

* * * * *